United States Patent [19]

Falk

[11] 3,748,908
[45] July 31, 1973

[54] DEVICE FOR TAKING A MOLTEN SAMPLE
[76] Inventor: Richard A. Falk, 519 Westminster Dr., Waukesha, Wis.
[22] Filed: Jan. 17, 1969
[21] Appl. No.: 811,682

Related U.S. Application Data
[60] Division of Ser. No. 676,005, Oct. 2, 1967, Pat. No. 3,401,201, which is a continuation-in-part of Ser. No. 589,296, Oct. 25, 1966, abandoned.

[52] U.S. Cl. .................. 73/354, 73/17 R, 136/231, 136/234
[51] Int. Cl. ........................ G01n 25/04, G01k 1/14
[58] Field of Search .............. 73/354, 359, 421 MM, 73/425.4, 17 R; 136/231, 234

[56] References Cited
UNITED STATES PATENTS

| 3,236,103 | 2/1966 | Kooken | 73/425.2 |
| 3,321,973 | 5/1967 | Anderson | 73/359 |
| 3,367,189 | 2/1968 | Curry | 73/421 |
| 3,455,164 | 7/1969 | Boyle | 73/354 |
| 3,463,005 | 8/1969 | Hance | 73/354 |
| 3,559,452 | 2/1971 | Perbix | 73/17 R |

OTHER PUBLICATIONS

"Rapid Temperature Measurements of Molten Iron and Steel with an Immersion Thermocouple" by Fulton Holtby in Transactions of the American Society for Metals, Volume 29, December 1941, page 878.

Primary Examiner—Richard C. Queisser
Assistant Examiner—Denis E. Corr
Attorney—Wheeler, Wheeler, House and Clemency

[57] ABSTRACT

A sampling lance for molten metal comprising a refractory cartridge with side, top and bottom walls and with a side entry port is mounted in an insulating cardboard sleeve and is utilized for obtaining a sample directly from any source of molten metal such as a bath, ladle or ingot. The cartridges are provided with thermocouples for measuring bath temperatures and cooling curves of the samples simultaneously with taking the sample.

9 Claims, 7 Drawing Figures

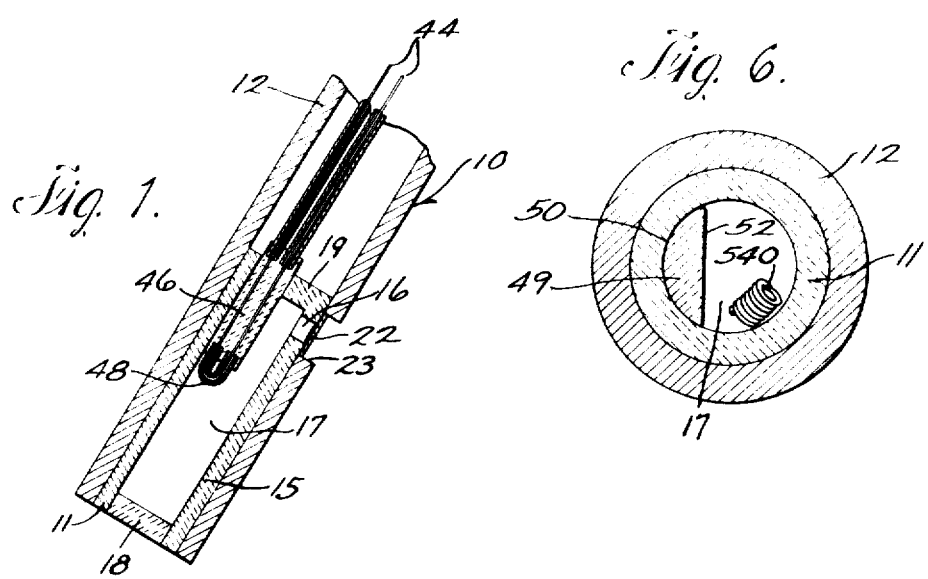

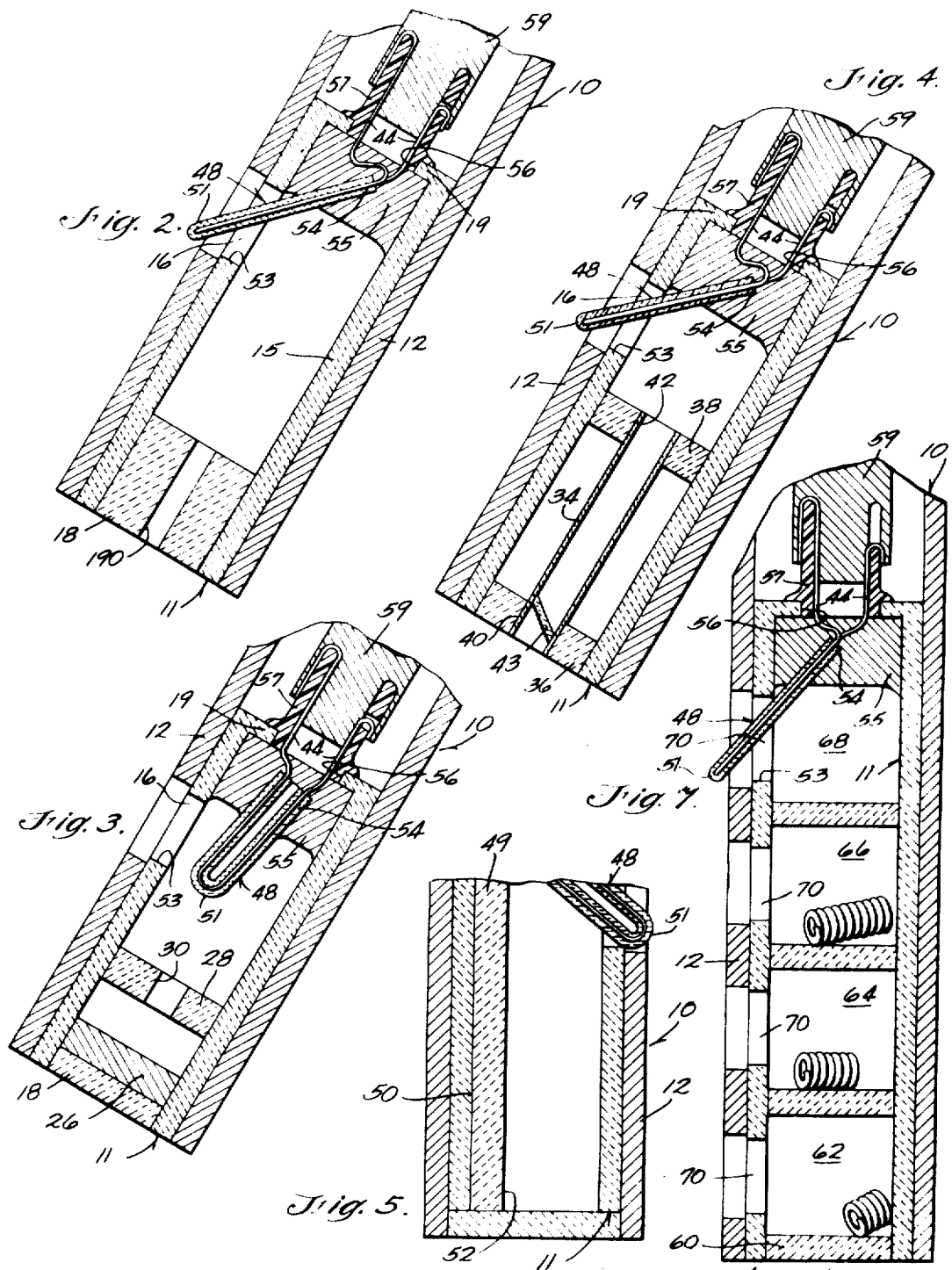

DEVICE FOR TAKING A MOLTEN SAMPLE

This application is a division of my U.S. Pat. No. 3,401,201 which issued Dec. 2, 1969 on application Ser. No. 676,005, filed Oct. 2, 1967 and which was a Continuation-In-Part of my application Ser. No. 589,296, filed Oct. 25, 1966 (now abandoned).

BACKGROUND OF THE INVENTION

The invention relates generally to the sampling of molten metal and in particular to a sampling lance therefor. Prior art sampling devices have failed to provide apparatus which furnishes samples initially of appropriate sizes for the various analysis techniques used in the industry. Furthermore, prior art apparatus has failed to provide homogeneous samples with a uniform kill and a high degree of chill. Prior art devices are also extremely expensive to produce and do not provide a sample that is easily and quickly removed from the sampling lance.

In practice, continual testing of a heat of metal is necessary to obtain a steel of the desired composition and with the desired properties. In a 24 hour period in a typical oxygen furnace operation the number of samples taken can be several hundred. Accordingly, it is desirable that the sampling apparatus be inexpensive.

The cost of operating an oxygen furnace per minute is very substantial and the time required to take samples, to recover the samples from the sampling device and make chemical analysis of the sample is extremely important.

Heretofore apparatus for obtaining a sample useful for immediate analysis, and simultaneously obtaining bath temperature and recording cooling curve of the sample has not been available in the art.

SUMMARY OF INVENTION

My invention provides a sampling lance which is inexpensive to manufacture and which furnishes samples initially of appropriate sizes for gas or spectrographic analysis or other conventional analysis techniques. The sample is easily removed from the sampling lance by shattering the refractory cartridge. With my sampling lance a sample can be directly obtained from any source of molten metal, such as a bath, ladle or ingot. Some embodiments of the invention are adapted to provide an extremely high homogeneity of the crystalline structure which is necessary for accurate analysis of all elements in the sample, some of which may be in very large or minute quantities.

Embodiments of the sampling lance include thermocouples which permit recordation of the bath temperature and the cooling temperature curve to facilitate location of the inflection point caused by precipitation or crystallization of austenite from the melt. An important feature is that the sample and the temperature determination are obtained simultaneously, giving improved correlation of results with less expenditure of time. Moreover, the sample and temperature can be obtained without turning down the vessel, thus saving valuable time.

Calibration of the instruments used in this method by more conventional analysis methods provides a rapid technique for determination of carbon content.

Further objects and advantages of the present invention will become apparent from the following disclosure in which:

FIG. 1 is a sampling lance provided with a thermocouple.

FIG. 2 is a further embodiment of the lance provided with a thermo-couple projecting through the side entry part.

FIG. 3 is an additional embodiment of the lance.

FIG. 4 is an additional embodiment of the sampling lance provided with a thermo-couple.

FIG. 5 is a fragmentary sectional view of a further embodiment of the invention.

FIG. 6 discloses a cross sectional view of the cartridge of FIG. 5 taken at right angles to FIG. 5.

FIG. 7 is a further embodiment of the lance for obtaining multiple samples with different quantities of kill and a thermo-couple.

Referring now to the drawings, FIG. 1 shows a sampling lance generally designated 10 which includes a refractory cartridge 11 inserted within lance tube 12, which contains and molds the metal sample. The lance 10 is partially immersed in a melt 13 which has a slag layer 14. The tube 12 can be paper board or any other insulating material which will protect the cartridge and facilitate immersion of the cartridge in a bath of metal.

Cartridge 11 is constructed of any suitable refractory and has a cylindrical side wall 15. The side wall 15 has a radial aperture 16 which provides an entry port into the cartridge cavity 17. The cartridge 11 is sealed at the bottom by a refractory plug or bottom 18 sealed in the cartridge by a refractory cement. The top of cartridge 11 may be sealed by an integral top wall or separate plug 19. The entry port 16 is desirably near the top wall 19 to prevent undue escape of the sample as it is removed from the melt. In the embodiment shown in FIG. 2 plug 18 is provided with an axial passage 190, to form a pin sample 20. In withdrawing the lance 10 from the bath, killed metal runs from chamber 17 through passage 190, expelling unkilled metal and giving a uniform sample. When the lance leaves the bath, the metal cools in passage 190 and ceases to escape. Port 16 is initially closed by an aluminum or steel cap 22 cemented over port 16 with refractory cement 24 to seal the cartridge 11 as it is lowered into the steel melt and prevent entry of slag 14. Tube 12 has an aperture 23 larger in diameter than the entry port 16 which facilitates flow of metal into the cartridge and tends to keep contaminants from the tube out. In use, an aluminum cap will melt substantially instantaneously. A steel cap will take up to 3 seconds to melt before permitting entry of the sample. This allows pre-heating of the cartridge and prevents chilling of the outer edges of the sample when contacting the cartridge walls, resulting in more uniform cooling and accordingly, a more homogenous sample.

Entry port 16 is desirably of a size sufficient to permit rapid entry of melt but prevent the sample from running out upon removal of the lance 10 from the steel melt. It has been empirically determined than an entry port of five-eighths inch in diameter is sufficiently large to prevent rapid entry of material but small enough to prevent undue spill upon removal. With an aperture of less than one-half inch entry is too slow and the sample does not fill and cool simultaneously so the sample is not as homogenous as desired.

The lower practical limit for the diameter of the entry port 16 is three-eighths inch. With an entry port 16 less than three-eighths inch the sample is stratified and has a poor kill distribution. The upper practical limit of the side entry port 16 is 1 inch in diameter with a larger port resulting in interchange of kill with the bath resulting in a non-uniform kill throughout the sample. The use of the thermo-couple as shown in FIGS. 10 through 14 may modify these sizes to a minor degree.

In the embodiment shown in FIG. 3, the cartridge 11 is provided with a steel disk 26 which serves as a chill for quickly cooling the melt. The chill is sealed in the cartridge by plug 18 and thus insulated from the bath to afford an extremely high degree of chill. Spaced above the chill within the cartridge is an obstruction which in the disclosed construction is a refractory annulus 28 extending across the interior of the cartridge 11 and which has an axial aperture 30. Aperture 30 is desirably about three-eighths inch in diameter. A smaller hole results in non-uniform killing and cooling, which causes lapped layers in the sample. The disk 28 serves as an insulator and prevents the sample from being remelted as additional iron flows into the chamber 17 through side entry port 16. This embodiment is particularly desirable for use in hot metal baths with a temperature range of 2,100° to 2,500° F. Use of the chill 26 and the annulus 28 results in a disk sample with extremely high homogeneity which is desirable when attempting to analyze an iron melt containing a number of different elements, and spectrographic analysis of the sample is intended.

In the embodiment disclosed in FIG. 4, the cartridge is adapted to provide a pin sample with a very smooth surface. In this embodiment, the sample is primarily formed in a fused quartz tube 34 mounted between two refractory or ceramic annular members 36 and 38, which have respective axial apertures 40 and 42.

Ferrostatic pressure causes some fill directly into the tube 34 from the melt 13 upon immersion of the lance 10. I have found that a sample with a smoother outer surface is obtained if a kill is placed in the end of tube 34 adjacent annular member 36. The kill 43 may be a piece of aluminum wire cemented in tube 34. When this device is removed from the melt 13, there is some runout from the tube 34. This permits the melt contained in the cartridge above member 38 to fill tube 34 providing a sample with a uniform distribution of kill.

In the embodiment disclosed in FIG. 1, the cartridge is provided with a heat sensing device such as a thermocouple which includes a pair of wires 44 which run through a ceramic sleeve 46. Although in the disclosed construction the sleeve 46 is shown located against the side wall 15 the sleeve can occupy a variety of positions in the cartridge 11. At least the exposed portion of the thermo-couple wire extends through a U-shaped fused quartz tube 48 for protection. The wires are adapted to be connected to registering means such as a meter or a known temperature recording apparatus to provide a time-temperature curve when the cartridge is withdrawn from the steel melt and the sample contained therein is cooling. It is known that as the melt cools, the temperature curve levels off briefly as the carbon in the sample crystalizes. The apparatus can be calibrated by comparison of samples from the same melt analyzed using conventional chemical analysis techniques such as gas-chromographic analysis or spectrographic analysis.

In the device shown in FIG. 2 the quartz tube 48 containing the thermo-couple wire projects through the side entry port 16. This orientation is preferable over the construction illustrated in FIG. 1 for measurement of bath temperature. In FIG. 3 the tip 51 of the tube 48 extends slightly below the lower lip 53 of the side entry port 16. This orientation is preferable for measuring the cooling curve to locate the carbon precipitation point. In this construction the tip 51 of the thermocouple must be below the lip so that it will not be in the shrinkage cavity formed around the entry port as the sample cools. This orientation of the thermo-couple also insures immersion of the thermo-couple in the sample. It also is preferable to have the tip 51 located adjacent to the interior wall of the cartridge near the entry port 16 wherein the metal flow into the entry port will raise the temperature of the refractory wall around the entry port to the bath temperature giving a more accurate reading of the bath temperature than if the thermo-couple were concentric to the interior of the cartridge. It has been empirically determined that satisfactory results are obtained if the tip 51 of the thermo-couple is located at approximately one-half the radial distance from the cartridge center to the side wall having the side entry port.

In the constructions illustrated in FIGS. 2 and 3 the upper end 54 of the quartz tube 48 is surrounded with refractory cement 55. The upper wall 19 of the cartridge is spaced from the side entry port 16 and is provided with an aperture 56 which receives a plug 57. The refractory cement and the top wall 16 form a cold junction which insulates the wires 44 from the bath. The upper ends of the wires 44 are formed around the upper lip of the plug 57 and are exposed to make contact with a connector 59 containing wires for connection to instruments.

In FIG. 10 a thermo-couple is shown incorporated in the cartridge illustrated in FIG. 1 to obtain a pin sample for gas analysis. In FIG. 11 a thermo-couple is shown incorporated in the embodiment illustrated in FIG. 6 with a steel chill 26. In FIG. 12 the thermo-couple is shown in the cartridge illustrated in FIG. 7 with a fused quartz tube 34 to obtain a pin sample with a smooth surface. The thermo-couple arrangements shown in FIGS. 6, 10 and 11 can be used with any of the embodiments of the sampling lance.

Because my apparatus may be dipped directly into the bath without destruction, and because the sample is in an insulated chamber and need not be poured into other apparatus so that the cooling curve is less distorted than in previous apparatus, and because my device is disposable, it is far more accurate and convenient than prior art apparatus used in cooling curve analysis.

My apparatus permits the taking of bath temperature, determination of carbon inflection point of the cooling sample, and obtaining a sample in one rapid operation rather than a series of individual steps as is presently done in the art to accomplish the same objective. Heretofore, the vessel had to be turned down or tipped to permit taking of a sample and temperature which might take 4 to 6 minutes.

In FIGS. 5 and 6, a cartridge is shown with a member 49 comprising a segment of a cylinder which has a cross-section defining a segment of a circle inserted within the cartridge cavity 17. Member 49 has an arcuate face 50 and a flat face 52 and is generally semicircular or less in cross-section. Insert member 49 provides a sample with a relatively flat surface which is useful for certain types of analysis apparatus. In the past, it has been necessary to cut or grind a flat, which takes critical time. Also shown in FIG. 6 is a coil of aluminum wire 540 which serves as a kill.

Referring to FIG. 7, there is shown a cartridge 60 having multiple chambers 62, 64, 66 and 68 with each chamber having a side entry port 70. The lance also includes a thermo-couple 48 extending through the side entry port 70 of chamber 68. Chambers 62, 64 and 66 contain varying quantities of kill which, as shown in FIG. 7, are coils of aluminum wire. This cartridge is useful in determining the amount of kill that must be added to a ladle to obtain the optimum kill to deoxidize the steel. Upon removal of the lance shown in FIG. 7 from the bath upon cooling, the refractory can be shattered and the samples in the various chambers examined to determine the required quantity of kill for the particular bath. The sampling lances 10 can be used as disclosed in my U.S. Pat. No. 3,481,201, which issued on Dec. 2, 1969.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

I claim:

1. A cartridge for sampling molten metal comprising refractory side, top and bottom walls, a sample entry port in said side wall sized to freely admit molten metal at bath temperature and to retain a substantial quantity of said metal upon withdrawal from said bath, insulating means for protecting said cartridge and for extending said cartridge into a bath of molten metal, said insulating means having an aperture communicating with said entry port in said cartridge, the margins of said aperture being spaced radially outwardly from the margins of said cartridge, and heat sensing means adapted to furnish a recordable response to the temperature of a molten sample entering said cartridge through said entry port.

2. A cartridge for sampling molten metal comprising refractory side, top and bottom walls, a sample entry port in said side wall sized to freely admit molten metal at bath temperature and to retain a substantial quantity of said metal upon withdrawal from said bath, consumable insulating means surrounding said cartridge, said insulating means having an aperture communicating with said entry port in said cartridge, the margins of said aperture of said insulating means being radially outwardly spaced from the margins of said entry port of said cartridge, including heat sensing means adapted to furnish a recordable response to the temperature of a molten sample.

3. A refractory cartridge for sampling molten metal, said cartridge having side, top and bottom walls, a sample entry port in said side wall sized to freely admit molten metal at bath temperature and to retain a substantial quantity of said metal upon withdrawal from said bath, and wherein said bottom wall of said cartridge has a cylindrical passage extending therethrough, including heat sensing means adapted to furnish a recordable response to the temperature of a molten sample entering said cartridge through said entry port.

4. A refractory cartridge for sampling molten metal, said cartridge having side, top and bottom walls, a sample entry port in said side wall sized to freely admit molten metal at bath temperature and to retain a substantial quantity of said metal upon withdrawal from said bath, and wherein said cartridge contains a steel chill at the lower end thereof, said cartridge being further provided with an insulating refractory member within said cartridge and extending across said cartridge and spaced between said chill and said entry port, and passage means extending from the portion of said cartridge containing said port to the portion of said cartridge containing said chill, said passage means being sized for free passage of molten metal at bath temperature, and said cartridge being provided with heat sensing means adapted to furnish a recordable response to the temperature of a molten sample.

5. A refractory cartridge for sampling molten metal, said cartridge having side, top and bottom walls, a sample entry port in said side wall sized to freely admit molten metal at bath temperature and to retain a substantial quantity of said metal upon withdrawal from said bath, and wherein said bottom wall of said cartridge comprises a first annulus, a second annulus spaced from said first annulus, and an elongated smoothwalled refractory tube extending through and supported by said annuli, and said cartridge being provided with heat sensing means adapted to furnish a recordable response to the temperature of a molten sample.

6. A refractory cartridge for sampling molten metal, said cartridge having side, top and bottom walls, a sample entry port in said side wall sized to freely admit molten metal at bath temperature and to retain a substantial quantity of said metal upon withdrawal from said bath, and wherein said cartridge is provided with a sample shaping member having a generally semi-circular cross-section, and said cartridge being provided with heat sensing means adapted to furnish a recordable response to the temperature of a molten sample.

7. A refractory cartridge for sampling molten metal comprising side, top and bottom walls, means secured to said cartridge adapted for inserting and removing said cartridge in a bath of molten metal, a sample entry port in said side wall sized to freely admit molten metal at bath temperature and to retain a substantial quantity of said metal upon withdrawal from said bath, said entry port having a lower lip and heat sensing means located within said cartridge, said heat sensing means comprising a U-shaped fused quartz tube containing thermocouple wires, the tip of the tube extending from adjacent said cartridge top wall, an aperture in said top wall, connecting leads connected to said thermocouple wires and extending through said aperture, a mass of refractory cement supporting said quartz tube in said cartridge with the cement sealing said top wall aperture and filling the space in said cavity between said tube and said side wall with said tip being located beneath said lower lip so that said tip will not be in the shrinkage cavity in the sample as the sample cools.

8. A refractory cartridge for sampling molten metal comprising side, top and bottom walls, means secured to said cartridge adapted for inserting and removing said cartridge in a bath of molten metal, a sample entry port in said side wall sized to freely admit molten metal at bath temperature and to retain a substantial quantity of said metal upon withdrawal from said bath, and heat sensing means comprising a U-shaped fused quartz tube containing thermocouple wires, the tip of the tube extending from adjacent said cartridge top wall, an aperture in said top wall, connecting leads connected to said thermocouple wires and extending through said aperture, a mass of refractory cement supporting said quartz tube in said cartridge transversely to the longitudinal axis of said cartridge with the cement sealing said top wall aperture and filling the space in said cavity between said tube and said side wall with said tip extending through said entry port from within said cartridge to obtain a measurement of bath temperature when said cartridge is immersed in molten metal.

9. A refractory cartridge for sampling molten metal, said cartridge having side walls and a bottom wall, a plurality of partitions extending across the interior of said cartridge to form chambers in said cartridge, and a sample entry port in each of said chambers, and wherein at least one chamber is provided with heat sensing means.

* * * * *